United States Patent [19]

Hocker et al.

[11] 4,408,027

[45] Oct. 4, 1983

[54] FOILS OF POLYACETYLENE

[75] Inventors: Jürgen Hocker, Bergisch-Gladbach, Fed. Rep. of Germany; Wolfgang Wieder, Lillebonne, France; Rolf Dhein, Krefeld, Fed. Rep. of Germany

[73] Assignee: Bayer Aktiengesellschaft, Leverkusen-Bayerwerk, Fed. Rep. of Germany

[21] Appl. No.: 288,887

[22] Filed: Jul. 31, 1981

[30] Foreign Application Priority Data

Aug. 9, 1980 [DE] Fed. Rep. of Germany ....... 3030194

[51] Int. Cl.³ .............................................. C08F 38/02
[52] U.S. Cl. .................................. 526/185; 526/285
[58] Field of Search ............ 526/159, 164, 169, 169.1, 526/169.2, 285, 185

[56] References Cited

U.S. PATENT DOCUMENTS 3,119,799  1/1964  Natta .................................. 526/159
4,277,588  7/1981  Naarmann ........................... 526/159

*Primary Examiner*—Paul R. Michl
*Attorney, Agent, or Firm*—Connolly and Hutz

[57] ABSTRACT

Process for the production of a suspension of polyacetylene in the form of particles having a diameter of from 0.01 to 1 mm and having a great number of fibrous appendices comprising introducing acetylene in an organic suspending agent under constant stirring, in the presence of an aluminum-containing organometallic mixed catalyst in an amount corresponding to 10 to 100 m moles aluminium per liter suspending agent, at temperatures of from −100° to 80° C., until a maximum of 10 g, preferably 1 to 3 g of polyacetylene per liter of suspending agent have been formed.

2 Claims, 1 Drawing Figure

U.S. Patent    Oct. 4, 1983    4,408,027
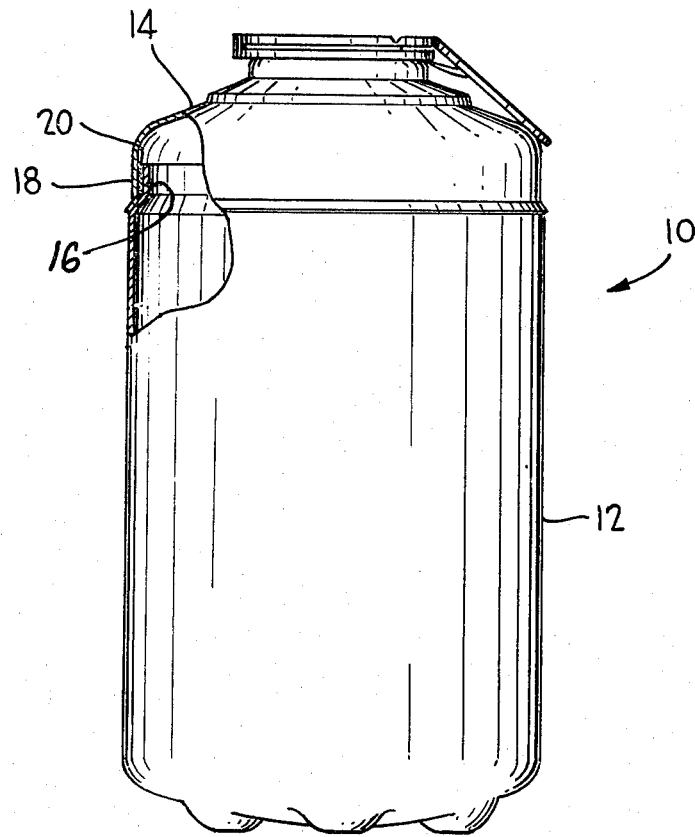

FOILS OF POLYACETYLENE

This invention relates to a process for the production of a suspension of polyacetylene in the form of particles having a diameter of from 0.01 to 1 mm and having a great number of fibrous appendices (FIG. 1), wherein the acetylene is introduced in an organic suspending agent under constant stirring, in the presence of an organometallic mixed catalyst in an amount corresponding to 10 to 100 mmoles aluminium per liter suspending agent, at temperatures of from $-100°$ to $+80°$ C., until a maximum of 10 g, preferably 1 to 3 g of polyacetylene per liter of suspending agent have been formed.

The polymerisation of acetylene in the presence of organometallic mixed catalysts is known. The state of development is indicated in Journal Polymer Science, volume 12, pages 11 to 20. Polyacetylene is insoluble in all solvents and when acetylene is polymerised in the presence of organometallic mixed catalysts it generally precipitates as a powder which cannot be worked up. The polymerisation of acetylene is generally carried out by introducing acetylene gas into a solution of an organometallic mixed catalyst in a solvent, under anaerobic conditions. Suitable organometallic mixed catalysts, also known as Ziegler catalysts, are obtained by the reaction of a compound of one of the metals, titanium, vanadium, chromium, iron, cobalt or manganese (e.g. a halide, an ester or a salt thereof with an organic acid) with an aluminium alkyl. This polymerisation, which is generally carried out with vigorous mixing of the polymerisation medium, produces the polyacetylene in the form of a powder which cannot be worked up. In order to be able to obtain polyacetylene in a usable form, for example as a foil, mixing must be omitted and catalysts of the type $Ti(OC_4H_9)_4/Al(C_2H_5)_3$ must be used, in other words, catalysts based on titanium compounds and aluminium alkylene.

When acetylene is passed over a solution of this catalyst in an organic solvent, a film of polyacetylene forms on the surface if agitation of the medium is carefully avoided. This film may be lifted off and investigated. Large areas of film obviously cannot be produced by this method and the thickness of the film is difficult to determine.

According to the present invention, foils of polyacetylene may be produced in any form and thickness. To achieve this, a solution of an organometallic mixed catalyst in an inert solvent is first prepared and gaseous acetylene is introduced with vigorous mixing. The conditions indicated above as regards quantity of catalyst, temperature and the quantity of acetylene to be introduced must be observed.

By organo-metallic mixed catalysts, also known as Ziegler catalysts, are meant reaction products of, on the one hand, compounds of heavy metals of groups 4b, 5b, 6b, 7b and 8 of the periodic system of elements (Handbook of Chemistry and Physics 47th Edition (1966), page B 3 - Chemical Rubber Company Cleveland, Ohio) with, on the other hand, aluminium alkylene or aluminium alkyl halides. The molar ratio of aluminium to heavy metal in these reaction products is generally from 1:1 to 20:1, preferably from 2:1 to 10:1.

Particularly suitable heavy metal compounds are the halides (in particular chlorides), oxyhalides and alkoxides of titanium, vanadium, chromium and tungsten, such as $TiCl_4$, $WCl_6$, and $VOCl_3$. The aluminium alkyl compounds may be represented by the formulae $AlR_3$, $AlXR_2$, $AlX_2R$ and $Al_2X_3R_3$, wherein X denotes halogen, in particular chlorine, and R denotes $C_1$ to $C_{12}$ alkyl, such as methyl, ethyl and isobutyl. Triethyl aluminium, trioctyl aluminium and triisobutyl aluminium are particularly suitable.

Suitable inert solvents are, in particular, hydrocarbons such as benzene, toluene, hexane, tetraline, decaline and halogenated hydrocarbons such as methylene chloride and chlorobenzene.

The catalysts are prepared by reaction of the heavy metal compound and the aluminium compound in the solvent at temperatures of $-100°$ C. to $+30°$ C. in known manner. The solution used for the following polymerisation generally contains from 10 to 100 mmol of aluminium per liter of solvent. Acetylene is introduced into this solution under anaerobic conditions at temperatures of from $-100°$ C. to $+80°$ C., preferably from $-80°$ C. to $-30°$ C. A suspension of polyacetylene forms. Under the microscope the suspended particles have the appearance of small burrs. FIG. 1 illustrates the shape of the particles. Their average diameter is 0.01 to 1 mm. When the polymerization liquid is filtered off under vacuum (suction filtration), these "burrs" form a continuous layer in the form of a foil which can be lifted from the surface on which it lies (filter paper).

EXAMPLE 1,300 ml of toluene are introduced into a 2 liter glass beaker equipped with a stirrer, and 300 ml thereof are distilled off under a stream of nitrogen. The contents of the beaker are cooled to $-78°$ C., and 4.2 ml (125 mmol) of titanium tetrabutylate (100%) and 50 ml (50 mmol) of aluminium triisobutyl (1 molar in toluene) are added.

10 g of acetylene are passed through the catalyst solution at $-78°$ C. over a period of 1 hour with stirring; a dark precipitate of polyacetylene forms. The reaction is stopped with 0.5 g of 4-methyl-2,6-di-tertiary butyl phenol (ionol) in 400 ml of absolute toluene and the temperature is allowed to rise to room temperature in a stream of nitrogen. Under the microscope, the reaction mixture is seen to contain large, dark mauve polyacetylene structures in the form of burrs which, when left on the filter after suction filtration, felt together to form a stable foil with a metallic gloss.

The yield of polyacetylene is 2.5 g.

We claim:

1. Process for the production of a suspension of polyacetylene in the form of particles having a diameter of from 0.01 to 1 mm and having a great number of fibrous appendices, wherein acetylene is introduced in an organic suspending agent under constant stirring, in the presence of an aluminum-containing organometallic mixed catalyst in an amount corresponding to 10–100 mmol aluminium per liter suspending agent, at temperatures of from $-100°$ to $+80°$ C., until a maximum of 10 g, preferably 1 to 3 g of polyacetylene per liter of suspending agent have formed.

2. Process for the production of a foil of the polyacetylene particles of claim 1 which comprises removing the suspending agent with simultaneous felting together of the particles.

* * * * *